US008662688B2

(12) United States Patent
Nickel et al.

(10) Patent No.: US 8,662,688 B2
(45) Date of Patent: Mar. 4, 2014

(54) KEY WITH A COLORED HOUSING

(75) Inventors: Andreas Nickel, Sprockhövel (DE); Richard-Roman Jarnicki, Velbert (DE)

(73) Assignee: Witte Automotive GmbH, Velbert (DE)

( * ) Notice: Subject to any disclaimer, the term of this patent is extended or adjusted under 35 U.S.C. 154(b) by 103 days.

(21) Appl. No.: 13/308,811

(22) Filed: Dec. 1, 2011

(65) Prior Publication Data

US 2012/0140391 A1 Jun. 7, 2012

(30) Foreign Application Priority Data

Dec. 2, 2010 (DE) ......................... 10 2010 060 977

(51) Int. Cl.
*G01D 11/28* (2006.01)

(52) U.S. Cl.
USPC .................. 362/23.05; 362/23.03; 362/23.07; 362/23.19

(58) Field of Classification Search
USPC .......... 362/23.03, 23.05, 23.07, 23.12, 23.19; 206/37.1; 200/341, 302.2, 5 A, 310; 340/426.36, 815.48, 5.64, 5.72
See application file for complete search history.

(56) References Cited

U.S. PATENT DOCUMENTS

| | | | | |
|---|---|---|---|---|
| 7,046,136 | B2 * | 5/2006 | Sugimoto et al. | 340/539.1 |
| 2004/0099430 | A1 * | 5/2004 | Scudder | 174/52.3 |
| 2005/0269414 | A1 * | 12/2005 | Kell et al. | 235/492 |
| 2006/0023442 | A1 * | 2/2006 | De Los Santos et al. | 361/814 |
| 2006/0054484 | A1 * | 3/2006 | Uleski et al. | 200/341 |
| 2007/0227866 | A1 * | 10/2007 | Dimig | 200/302.2 |
| 2007/0270013 | A1 * | 11/2007 | Clark | 439/346 |
| 2007/0272565 | A1 * | 11/2007 | Rueckert et al. | 206/37.1 |
| 2008/0142129 | A1 * | 6/2008 | Reasner et al. | 150/131 |

FOREIGN PATENT DOCUMENTS

| | | |
|---|---|---|
| DE | 102007017208 | 10/2008 |
| DE | 102010060317 | 11/2010 |

* cited by examiner

*Primary Examiner* — Anh Mai
*Assistant Examiner* — Kevin Quarterman
(74) *Attorney, Agent, or Firm* — Lucas & Mercanti, LLP; Klaus P. Stoffel

(57) ABSTRACT

A key, primarily a remote control key for automobiles, with a housing that has an upper shell and a lower shell and a key held between the upper shell and the lower shell. To make the key housing more esthetically pleasing and easier to manufacture, the lower shell consists of a transparent plastic joined by laser welding to a colored core of the upper shell.

10 Claims, 6 Drawing Sheets

KEY WITH A COLORED HOUSING

CROSS-REFERENCE TO RELATED APPLICATIONS

The present application claims priority of DE 10 2010 060 977.3, filed Dec. 2, 2010, the priority of this application is hereby claimed and this application is incorporated herein by reference.

BACKGROUND OF THE INVENTION

The invention concerns a key, primarily a remote control key for automobiles, with a housing that has an upper shell and a lower shell and a key held between the upper shell and the lower shell.

A remote control key is known from DE 10 2007 017 208 A1. The remote key has a housing that comprises an upper shell and a lower shell. The upper shell and lower shell are joined to each other along their edge. Both shells consist of a dark plastic. In their assembled state, the upper shell and the lower shell form a housing cavity that contains an electronic circuit, which, upon activation by push buttons located on the upper side of the shell, enters into wireless communication with a transmitter and receiver located in a motor vehicle in order to exchange identification signals. If the remote control key has a lock authorization, then the central lock mechanism in the motor vehicle is opened. In order, if necessary, also to be able to open the motor vehicle with a mechanical key, the remote control key has a key shaft, which, when it is in a nonuse position, rests in a recess in a side wall of the housing. The key can be swung out into an operating position by pushing a push button against the restoring force of a push button spring. This is done with the help of a spring in order to unlock a steering column lock with the key and also to allow the vehicle to be started.

DE 10 2010 060 317, the entire disclosure of which is incorporated into the present patent application, describes a key in which the pivot bearing of the key is formed by interlocking sections of an upper and lower shell.

SUMMARY OF THE INVENTION

The objective of the invention is to make the key housing more esthetically pleasing and easier to manufacture.

This objective is achieved by the invention specified in the claims. First of all and in essence, this involves the fact that the lower shell consists of a transparent plastic. The edge of the lower shell lies against the edge of the upper shell. This is brought about by virtue of the fact that the narrow side of the edge of the upper shell can be exposed to a laser beam through the transparent lower shell. The lower shell is transparent to the laser beam, but the upper shell is not, so that, in the area of the joint, the upper shell melts and fuses to the lower shell, for example, by polymerization. The laser beam preferably passes at an angle through the material of the lower shell, which is clear or possibly colored, but in any event transparent to the laser beam, and welds the lower shell to the upper shell by being guided over the entire contact surface. During this operation, the lower shell and the upper shell are pressed together with a suitable pressing tool.

In a refinement of the invention, which is independent in nature, it is provided that the upper shell has a jacket made of a transparent material. A core of a colored plastic is injected into this jacket. The transparent lower shell is joined to the colored core of the upper shell in such a way that a stepped projection is formed at the joint. The edge of a covering shell rests against this stepped projection. The covering shell consists of a jacket, especially a clear, transparent jacket, into which a colored core, especially a black and white variegated core, is injected. The outside wall of the covering shell makes a flush transition with the outside wall of the upper shell. The covering shell can be attached to the housing, especially to the lower shell of the housing, by means of a snap-on connection. The key is preferably rotatably mounted on the housing. It can have a key shaft that is connected to a pivot bearing. The pivot bearing is supported around bearing elements that engage with each other. One of the bearing elements is formed by the core of the upper shell, and the other is formed by the core of the lower shell. The key shaft can be swiveled by about 180° from a nonuse position into an operating position. Both in the nonuse position and in the operating position, the key can be locked by suitable locking means, which are released by pushing a push button. The push button is preferably mounted within the pivot bearing.

In a refinement of the invention, which is also independent in character, it is provided that the upper shell has touch panels that are formed by a keypad, which, for example, is made of a softer plastic than the transparent jacket or the colored core. The edge of the keypad is laser-welded to a section of the transparent jacket. Here again, when the keypad and the transparent jacket are joined during the production of the housing shell, the keypad is pressed against a marginal section of the transparent jacket. The marginal area of the keypad is heated by a laser beam, to which the transparent jacket is transparent, in the area of the joint, so that the material of the keypad can permanently bond with the material of the transparent jacket. In a similar way, it is also possible to join a decorative part with the transparent jacket. The decorative part has a recess or a step for receiving a plastic element, which is laser-welded to the transparent jacket in the manner described above. In a preferred embodiment, the decorative part is a ring that surrounds the touch panels and thus the keypad. This ring, which consists, for example, of chrome or a chromium-plated material, is seated in a depression and is partially overlapped by the edge of the keypad, so that it is positively locked in place in the annular depression.

A refinement of the invention, which can also be regarded as independent in nature, relates to the design of status displays on the surface of the housing. For this purpose, the transparent jacket passes through the colored core in certain places to form an optical waveguide extension. This optical waveguide extension has a light entrance surface, which is located in front of a light source, for example, a light-emitting diode, which is arranged inside the housing. The light entrance surface can be located directly opposite the light exit surface, which is located in the outside wall of the transparent jacket. However, it can also be provided for a base cover to lie opposite the light exit surface of the status display. The base cover can be formed by the colored core. As a result of this design, the status display is practically invisible when the light source is not turned on. The light entrance surface in this case is formed by a lateral wall of the optical waveguide extension. The shells can bear an icon. The icon is preferably located beneath the transparent jacket. The covering shell preferably can be provided with a recess for holding the icon. In this case, it can be fastened, for example, by adhesive bonding. However, the icon can also be assigned to the lower shell, to which it can be bonded with adhesive or by other means. In addition, it can be provided that a laser beam be used to produce and optical identification in the interface between the color core and the transparent jacket.

The core surrounded by a transparent jacket can have any desired colors. This jacket not only gives a lustrous appearance but also provides protection from scratching.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

DETAILED DESCRIPTION OF THE INVENTION

Figure 1:
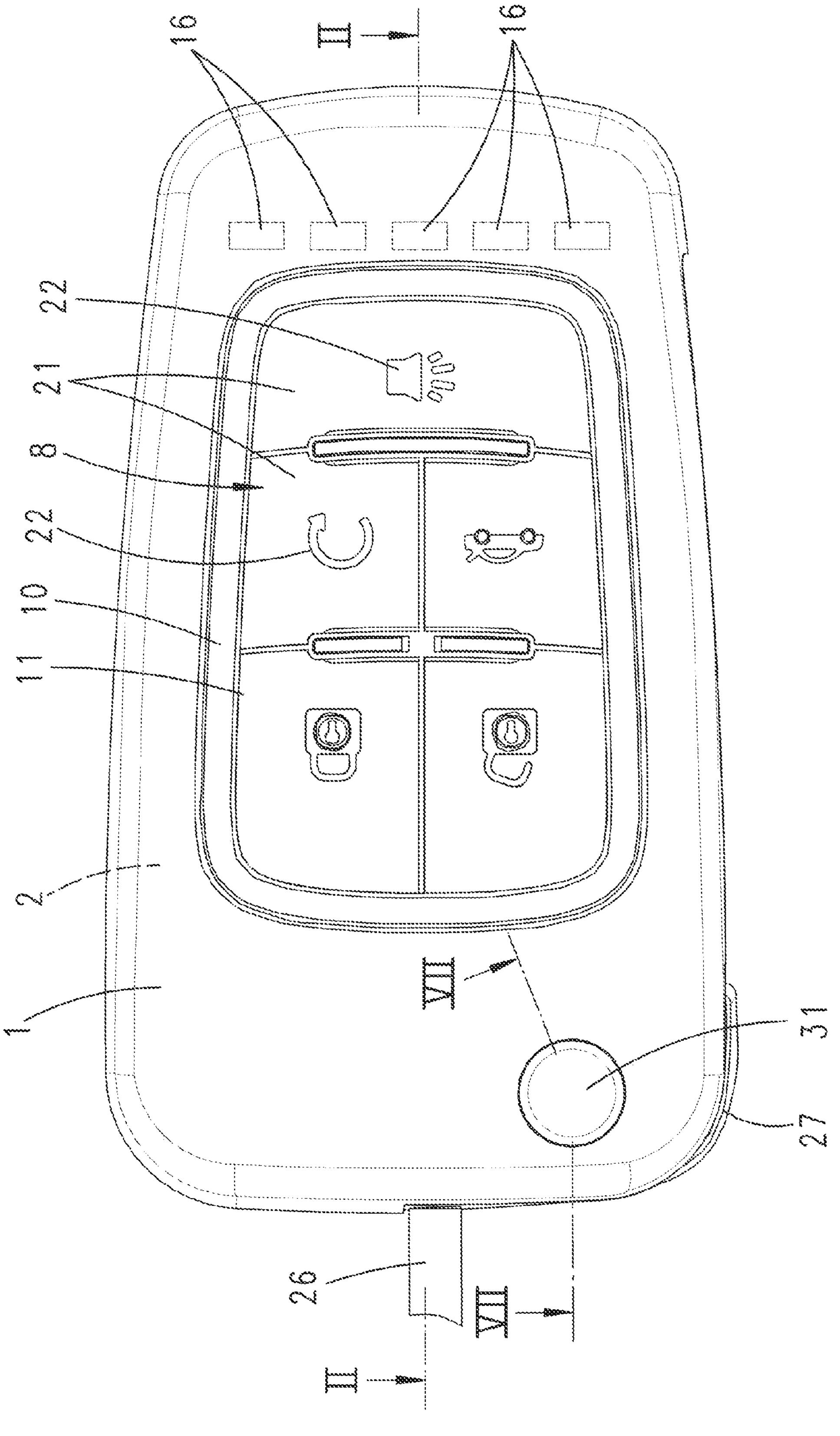
FIG. 1 shows a top view of the housing of a motor vehicle key.

The motor vehicle key shown in the drawings has a housing with a printed circuit board 23 on which an electronic circuit is arranged. The electronic circuit has an identification unit, which, together with a transmitter-receiver unit in the vehicle, forms a wireless data transmission link for transmitting identification signals. The printed circuit board also contains a receiving unit for receiving status reports from the vehicle, for example, the state of charging of the battery in an electric vehicle, the operating state of the auxiliary heater in a vehicle with auxiliary heating, or the locking state of a vehicle. In addition, the housing contains a battery 25 for supplying power to the electronic circuit. A key shaft 26 is pivoted at one edge of the housing. This key shaft can be swiveled from a stored position, in which it lies against one of the walls of the housing, into an operating position, in which it extends from the housing and can be inserted into a lock. For this purpose, a pivot bearing 27 is provided, about which the key can be turned. The bearing axis of the pivot bearing is formed by the housing.

The housing has an upper shell, which is produced by injection molding. In a first injection molding step, a transparent jacket 1 that consists of a transparent, especially clear, plastic is injected into a first mold. A change mold is used for this purpose. By replacing one mold for another, a colored core 2, for example, a core that consists of a blue, green, yellow or red polyamide, can be injected in the cavity of the transparent jacket 1. The colored core 2 can be provided with various pigments, so that the key shell can receive individual coloration, which results in a lustrous appearance due to the smooth-walled transparent jacket 1.

Figure 4:
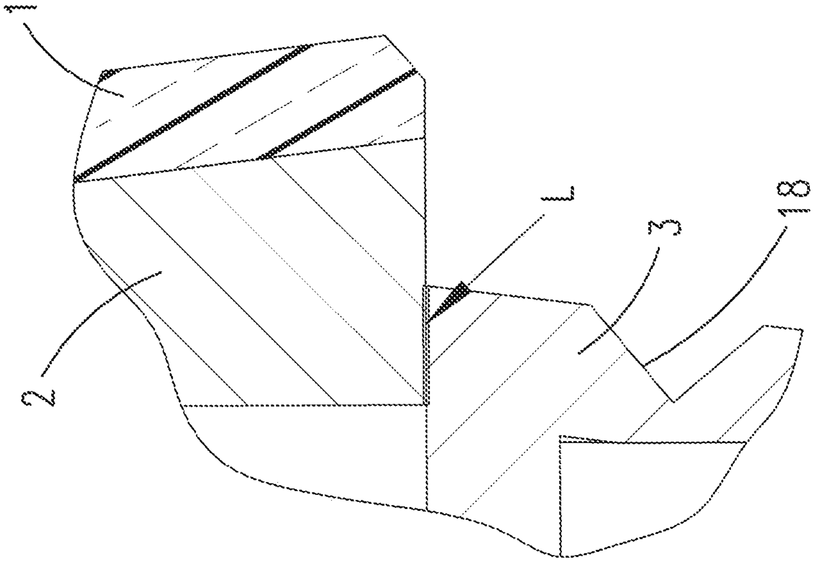
FIG. 4 shows an enlarged view of segment IV in FIG. 3.

The lower shell of the housing is formed by a plastic part 3, which is transparent at least to a laser beam. The lower shell 3 is transparent to the light of a laser beam, to which the edge of the lower shell 3 is welded with the edge of the colored core 2. To this end, the laser beam passes through the outside surface of the lower shell 3 at an acute angle, as indicated by the letter L in FIG. 4, and strikes the joint surface 7, where the edge of the lower shell 3 is pressed against the edge of the core 4. The pressure is applied by pressure plates (not shown). The laser beam heats the joint 7 and is guided around the entire lower shell, so that an uninterrupted weld is formed. Alternatively, however, it is also possible to weld the lower shell 3 to the core 2 only in spots.

The lower shell 3 is welded only to an edge of the colored core 2 that faces the housing cavity, so that a marginal region of the colored core 2 and the transparent jacket 1 forms a step. An edge of a covering shell 4, which is clipped onto the lower shell 3, lies in front of this step. For this purpose, the lower shell 3 has catch recesses 18, 34, into which catch projections 19, 33 of the covering shell 4 can engage. The covering shell 4 completely covers the transparent lower shell 3 and a battery change opening for removal of the battery 25.

The covering shell 4 consists of a two-component plastic. Here too, a preferably clear, transparent jacket 5 is produced from a transparent plastic. A colored core 6, which can consist of a polyamide and can have the pigmentation specified above, is then injected into the jacket 1.

Figure 5:
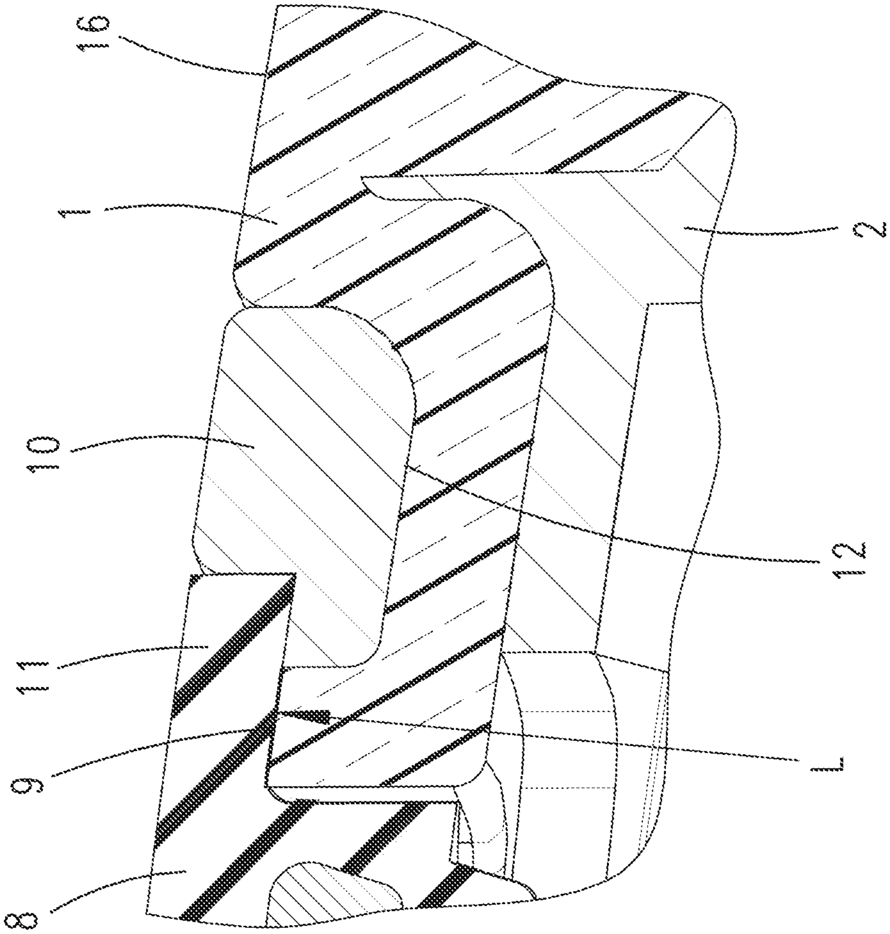
FIG. 5 shows an enlarged view of segment V in FIG. 3.

The upper shell 1, 2 forms an essentially trapezoidal recess that is filled by a keypad 8. The keypad 8 forms a plurality of touch panels 21, each of which is provided with injected symbols 22. The keypad 8 is surrounded by a chrome ring 10, which is seated in an annular depression 12. The opening of the annular depression 12 is directed to the outside and is formed by the transparent jacket 1. The edge of the keypad 8 is laser-welded with a marginal section of the transparent jacket 1 that extends into the trapezoidal opening. For this purpose, a marginal section in the area of a joint 9 rests against the inwardly directed wall of the keypad 8. As indicated by the arrow labeled L in FIG. 5, a laser beam can pass through the transparent jacket and strike the contact zone 9. The keypad 8 is pressed against the transparent jacket 1. The laser beam L heats the joint surface 9, so that the keypad 8 can bond with the jacket 1.

The joint 9 is located a small distance from the edge of the keypad 8, so that a marginal section 11 of the keypad 8 forms an overlapping section that covers a segment of the chrome strip 10. The chrome strip 10 thus forms a step, so that it is positively locked in place in the annular depression 12.

The broadside surface of the upper shell has a plurality of status displays 16, to each of which a light-emitting diode (LED) 14 is assigned. The LED's 14 are located on the printed circuit board 23. Each status display 16 has an optical waveguide extension 13, which is formed by the transparent jacket 1 and extends through the nontransparent core 2. The optical waveguide extension 13 forms a light coupling surface 13', which is positioned in front of the LED 14.

Figure 3:
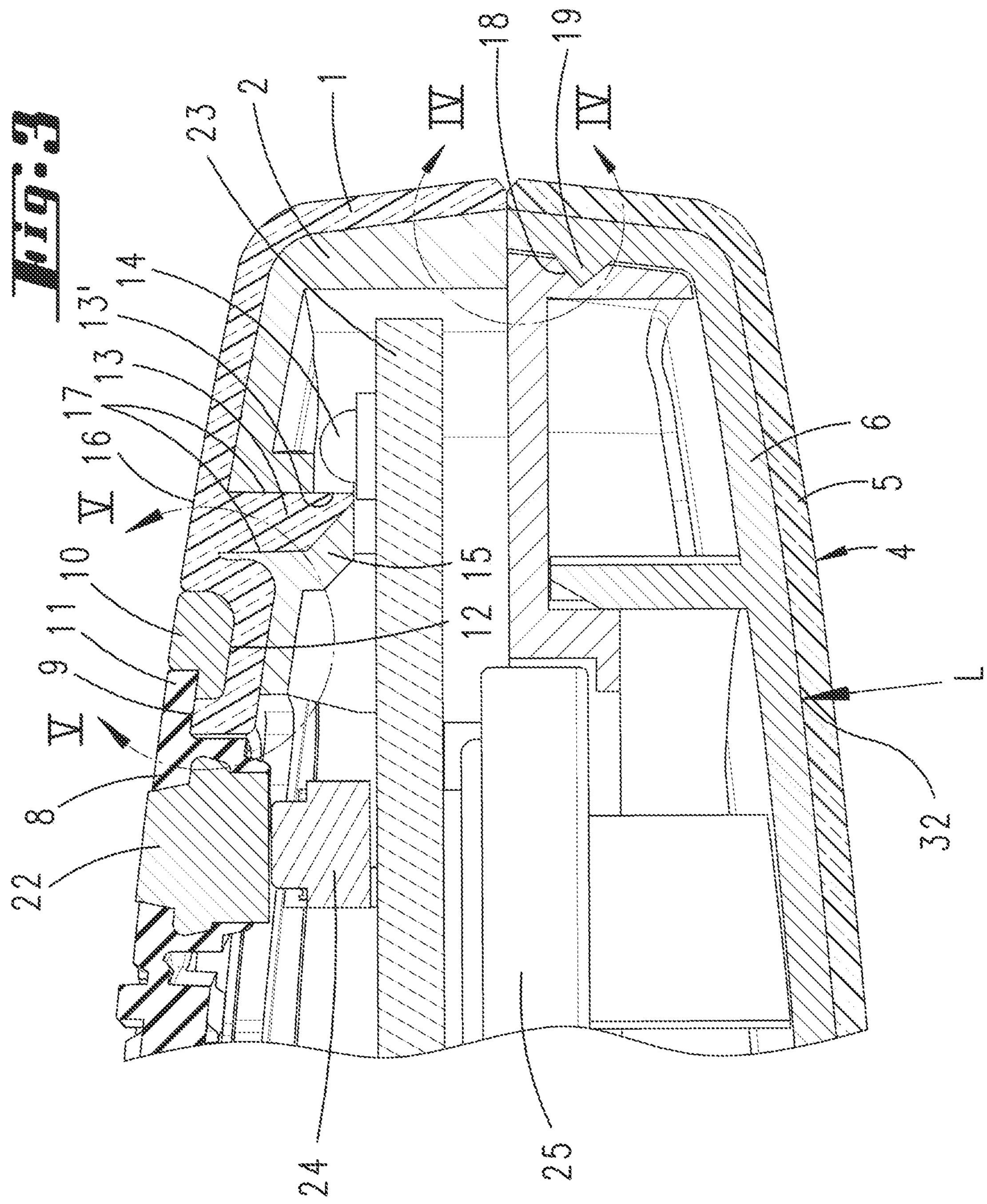
FIG. 3 shows an enlarged segment of the rear region of the section shown in FIG. 2.

In the embodiment illustrated in FIG. 3, the optical waveguide extension 13 extends in a shaft formed by parallel shaft walls 17. The shaft forms an obliquely running base 15, which terminates the optical waveguide extension 13 towards the bottom. The light entrance surface 13' is formed by a lateral wall of the optical waveguide extension 13, so that the light emitted by the LED 14 enters the optical waveguide extension 13 from the side. When an LED 14 is not lighted, only the base cover 15 is visible through the transparent jacket 1, so that the status display 16 is practically invisible when the LED 14 is not emitting light.

Figure 6:
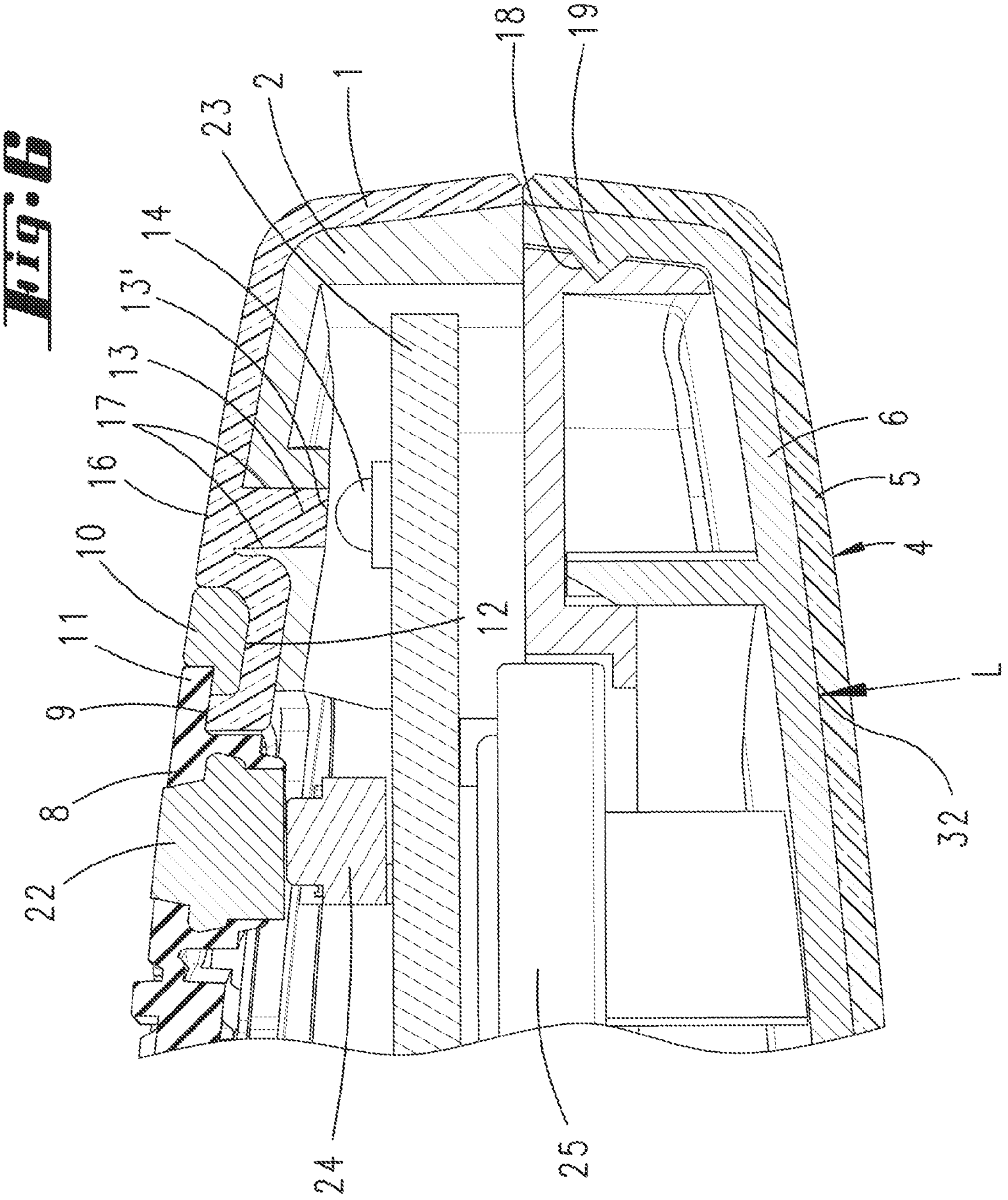
FIG. 6 shows a view similar to FIG. 3 for a second embodiment.
Figure 7:
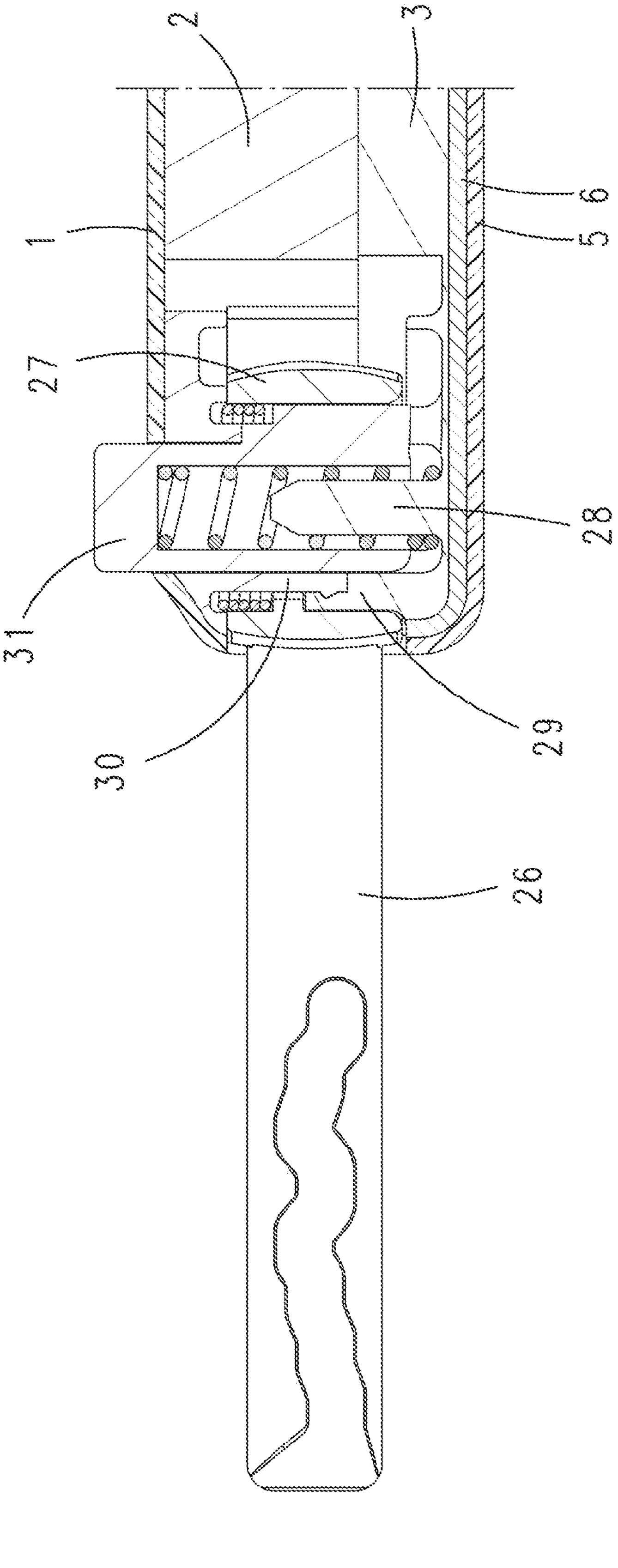
FIG. 7 shows a cross section along line VII-VII in FIG. 1.

In the embodiment illustrated in FIG. 6, the light entrance surface 13' lies directly opposite the light exit surface. The aforementioned symbols 22 can likewise consist of transparent plastic. However, they can also consist of a nontransparent plastic. They lie above key switches 24 and can be displaced transversely to the plane of extension of the keypad 8.

Reference number 32 denotes an optical identification in the interface between the transparent jacket 5 and the colored core 6, which was likewise produced by means of a laser beam L. In this use of the laser beam as well, the laser beam L passes more or less unattenuated through the transparent jacket 1 and in the area of the interface with the colored core 6 produces a transformation of the substance that is visible through the transparent jacket 5. An optical structure 32 can be written there by moving the laser beam L.

Figure 2:
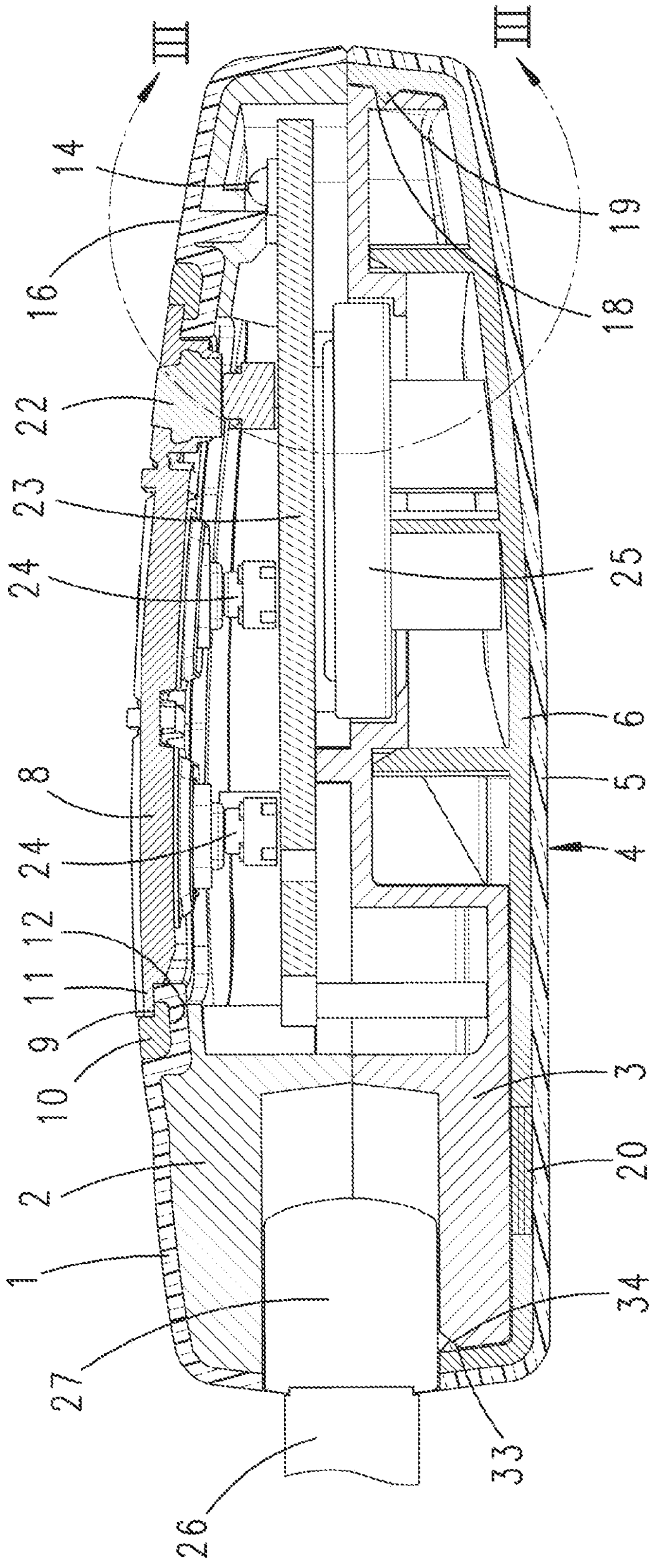
FIG. 2 shows a cross section of a first embodiment along line II-II in FIG. 1.

In FIG. 2, the colored core 6 of the covering shell 4 has a recess, in which an image or an icon 20 is placed in such a way that it is visible from the outside through the transparent jacket 5. The image or icon 20 can be attached either to the lower shell 3 or to the covering shell 4. The image or icon 20 can also be illuminated from below or from the side.

With respect to the bearing of the key between the two housing shell elements 3 and 2, see DE 10 2010 060 317.1. The upper shell, especially the colored core 2 of the upper shell, forms a bearing element 30 that extends in the direction towards the lower shell 3. The lower shell 3 forms a bearing element 29 that extends in the direction towards the upper shell 2. The two bearing elements 29, 30 engage each other. In addition, locking means are provided, with which the bearing elements 29, 30 are kept in a state of engagement with each other. The bearing elements 29, 30 form a bearing axis, about which a pivot bearing 27 that supports the key shaft 27 can rotate.

The bearing elements 29, 30 are hollow in construction, so that they can hold a push button 31 that lies in the bearing axis and serves to release a catch, with which the pivot bearing 27 is held in the end position of its rotation.

A bearing spindle 28, about which a compression spring is wound, extends into the push button 31.

The pivot bearing 27 is acted upon by a spring in a position that corresponds to the operating position of the key.

While specific embodiments of the invention have been shown and described in detail to illustrate the inventive principles, it will be understood that the invention may be embodied otherwise without departing from such principles.

LIST OF REFERENCE NUMERALS

1 transparent jacket
2 colored core
3 transparent lower shell
4 two-component covering shell
5 transparent jacket
6 colored core
7 welded joint
8 keypad
9 welded joint
10 decorative strip
11 overlapping section
12 depression
13 optical waveguide extension
13' light coupling surface
14 LED
15 base cover
16 status display
17 shaft wall
18 catch recess
19 catch projection
20 image/icon
21 touch panel
22 symbol
23 printed circuit board
24 key switch
25 battery
26 key shaft
27 pivot bearing
28 bearing spindle
29 bearing element
30 bearing element
31 push button
32 optical identification
33 catch projection
34 catch recess
L laser beam

We claim:

1. A key, comprising: a housing that has an upper shell and a lower shell, wherein the upper shell has a core that is colored and comprises pigments so as to be not transparent for a laser beam; and a key held between the core of the upper shell and the lower shell, wherein the lower shell consists of a material transparent for a laser beam, wherein joint surfaces of the lower shell and the core of the upper shell are joined by laser welding, and wherein the laser beam heating the joint surfaces passes through an outside surface of the lower shell.

2. The key in accordance with claim 1, wherein an outer part of the core of the upper shell is surrounded by a transparent jacket, wherein the lower shell is covered by a covering shell having a colored core, wherein an outer part of the core of the covering shell is surrounded by a transparent jacket, wherein the joint of the upper shell and the lower shell forms a stepped projection, on which an edge of the covering shell that has the colored core and a transparent jacket rests, such that the outside wall of the covering shell makes a flush transition with the jacket of the upper shell.

3. The key in accordance with claim 2, further comprising a plastic keypad that has an edge laser-welded to the transparent jacket.

4. The key in accordance with claim 3, further comprising a decorative part that is seated in a depression of the jacket and held in place by a plastic element laser-welded to the jacket.

5. The key in accordance with claim 4, wherein the decorative part is a ring that surrounds the keypad.

6. The key in accordance with claim 2, further comprising a light source, wherein in an area of a display, the jacket extends as an optical waveguide extension through the colored core and has a light coupling surface arranged in front of the light source.

7. The key in accordance with claim 6, wherein a base cover formed by the colored core lies opposite the display formed by the transparent jacket, the light coupling surface being formed by a lateral wall of the optical waveguide extension.

8. The key in accordance with claim 2, including a recess inside the colored core of the covering shell for holding an icon attached to the lower shell or to the jacket of the covering shell.

9. The key in accordance with claim 2, wherein an optical identification is produced in an interface between the jacket of the covering shell and colored core by a laser beam passing through the transparent jacket of the covering shell.

10. The key in accordance with claim 1, further comprising a key shaft connected to a pivot bearing, which can be rotated about bearing elements that engage with each other and are formed by the core of the upper shell and the lower shell.

* * * * *